US011936553B2

(12) United States Patent
Mikonis et al.

(10) Patent No.: US 11,936,553 B2
(45) Date of Patent: *Mar. 19, 2024

(54) AUTONOMOUS DATA ROUTING IN A PEER-TO-PEER COMPUTER NETWORK

(71) Applicant: Syntropy Network Limited, Palo Alto, CA (US)

(72) Inventors: Andrejus Mikonis, Vilnius (LT); Vytautas Jurenas, Vilnius (LT); Jonas Simanavicius, Vilnius (LT)

(73) Assignee: Syntropy Network Limited, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/313,326

(22) Filed: May 6, 2023

(65) Prior Publication Data

US 2023/0283540 A1 Sep. 7, 2023

Related U.S. Application Data

(63) Continuation-in-part of application No. 17/502,382, filed on Oct. 15, 2021, now Pat. No. 11,689,456.

(51) Int. Cl.
*H04L 45/121* (2022.01)
*H04L 43/0864* (2022.01)

(52) U.S. Cl.
CPC ........ *H04L 45/121* (2013.01); *H04L 43/0864* (2013.01)

(58) Field of Classification Search
CPC ....... H04L 45/70; H04L 43/00; H04L 9/3247; H04L 43/0852; H04L 43/0858; H04L 43/0864; H04L 43/087; H04L 45/7453; H04L 67/104; H04L 67/1042; H04L 67/1001; H04L 67/04; H04L 9/50; H04W 4/00; H04W 84/10; H04W 84/18
See application file for complete search history.

(56) References Cited

U.S. PATENT DOCUMENTS

| | | | |
|---|---|---|---|
| 8,570,861 B1* | 10/2013 | Brandwine | H04L 45/70 370/230 |
| 2010/0061385 A1* | 3/2010 | Welin | H04L 67/1065 380/277 |
| 2022/0141738 A1* | 5/2022 | Chou | H04L 41/5051 455/437 |
| 2022/0278922 A1* | 9/2022 | Kolar | H04L 43/0894 |

* cited by examiner

*Primary Examiner* — Ian N Moore
*Assistant Examiner* — Brian T Le
(74) *Attorney, Agent, or Firm* — SV Patent Service (57) ABSTRACT

A method is disclosed for autonomously routing data using in a peer-to-peer computer network includes automatically updating a peer-to-peer computer network. The method includes automatically sending pulse messages from a first node to neighbor nodes and candidate nodes, receiving return pulses by the first node from at least some of the neighbor nodes and the candidate nodes, calculating round-trip times (RTTs) between the first node and the neighbor nodes or the candidate nodes based on the pulse messages and the return pulses, sorting the nodes in the neighbor nodes and the candidate nodes into orbital bins based on RTTs, and automatically selecting and adding a node from one of the orbital bins based on the RTTs to updated neighbor nodes for the first node, and routing data from the first node to a second node via a relay node in the peer-to-peer computer network.

21 Claims, 5 Drawing Sheets

AUTONOMOUS DATA ROUTING IN A PEER-TO-PEER COMPUTER NETWORK

CROSS-REFERENCE TO RELATED APPLICATIONS

The present application is related to commonly assigned pending U.S. patent application Ser. No. 17/237,026, titled "Autonomously routing data using relay nodes pre-selected from a group of distributed computer nodes based on measured one-way latencies", filed Apr. 21, 2021, the content of which is incorporated herein by reference.

FIELD OF THE INVENTION

The present invention relates generally to the field of computer network, and in particular, to improving performance of data communications over computer networks such as the Internet.

BACKGROUND OF THE INVENTION

The current Internet transit services are vulnerable to eavesdropping, and fail to route around partially degraded networks, leading to suboptimal network performance.

Conventional technologies in the dynamically routed internet field primarily operate at the Network Layer (Layer 3) by selecting a best path for traffic based on the shortest path between the data sending node and the destination node, which often does not minimize data-transmission latencies. The conventional technologies also do not take into account network degradation. Related technologies in the Virtual Private Networking (VPN) provide protection from eavesdropping, but do not route around degraded network paths.

The current Internet system is inefficient and unreliable because of several key factors: first, economic incentives are misaligned. Internet service today provides global connectivity but is unable to guarantee the network performance of the connectivity provided. Internet Service Providers generally seek to minimize costs and maximize profits. Content providers seek to deliver the best end-user experience to maximize revenues and customer retention while minimizing costs, especially for IP transit while end-users want the best quality of service from both Internet Service Providers and content providers for free. Secondly, there is a lack of outbound routing control. Content providers cannot control how their outbound traffic is routed. As a result, routers typically forward the traffic along congested and suboptimal network paths to the destination, even when better alternative network paths exist. Thirdly, reliance on third-party security. The Internet's position as a zero-trust network fails to meet the challenges associated with online data sensitivity, increased cybercrime risk, and user inexperience. The vast majority of security solutions are guaranteed by a third party, such as a certificate authority or cloud provider. Consequently, traditional Internet bears the risk of that third party being compromised.

There is therefore a need for computer network technologies with improved transmission speed, improved security, and higher reliability in data delivery.

SUMMARY OF THE INVENTION

The present disclosure provides the implementation of a thin connection layer of software over the Internet, which can transform the public Internet into a computer network having significantly improved data transport. The connection layer consists of a peer-to-peer network of physical and virtual computer nodes which communicate with each other based on decentralized protocols.

In one general aspect, the present invention relates to a method for autonomously routing data using in a peer-to-peer computer network. The method includes automatically updating a peer-to-peer computer network comprising a plurality of nodes each associated with a unique node ID, comprising storing, at a first node, IDs of neighbor nodes that are connected to the first node in the peer-to-peer computer network; storing, at the first node, IDs of candidate nodes for connecting to the first node in the peer-to-peer computer network; automatically sending pulse messages from the first node to the neighbor nodes and the candidate nodes; in response to the pulse messages, receiving return pulses by the first node from at least some of the neighbor nodes and the candidate nodes; calculating round-trip times (RTTs) between the first node and the neighbor nodes or the candidate nodes based on the pulse messages and the return pulses; sorting the nodes in the neighbor nodes and the candidate nodes into a plurality of orbital bins each comprising nodes characterized by RTTs related to the first node within a specific interval; and automatically selecting and adding at least one node from one of the orbital bins based on the RTTs to updated neighbor nodes for the first node; and automatically routing data from the first node to a second node via a relay node that is one of updated nodes in the peer-to-peer computer network.

Implementations of the method may include one or more of the following. The updated nodes in the peer-to-peer computer network are formed by updated neighbor nodes of the plurality of nodes in the peer-to-peer computer network. An RTT between the first node and a node in the neighbor nodes or the candidate nodes can be calculated by a sending time stamp of a pulse message sent from the first node and a reception time stamp of a return pulse received by the first node in response to the pulse message, the sending time stamp and the reception time stamp being both recorded at the first node. At least some of computer clocks at the plurality of nodes can have skews or clock rate discrepancies relative to each other, wherein step of calculating round-trip times (RTTs) is independent of the skews or the clock rate discrepancies between the computer clocks at the plurality of nodes in the peer-to-peer computer network. The at least one node can be selected from each of the orbital bins further based on durations of the at least one node that has been an updated neighbor node in the peer-to-peer computer network. The neighbor nodes and the candidate nodes can be sorted substantially evenly into a plurality of orbital bins based on the RTTs of the associated return messages received by the first node. Updating a peer-to-peer computer network comprising a plurality of nodes further can include removing a node from the updated neighbor nodes for the first node if no return pulse is received from the node by the first node after a pulse message is sent from the first node to the node. Updating a peer-to-peer computer network comprising a plurality of nodes each associated with a unique node ID can further include removing a node from the updated neighbor nodes for the first node if return pulses from the node have jitter exceeding a predetermined threshold. Updating a peer-to-peer computer network comprising a plurality of nodes each associated with a unique node ID can further include repeating step of automatically selecting a node from another one of the orbital bins, wherein the node selected is added to the updated nodes in the peer-to-peer computer network. Step of automatically routing data from the first node to a second node via a relay node that is one of updated nodes in the peer-to-peer computer network can further include sending one or more path packages from the first node directly to the second node to measure a one-way latency (OWL) and jitter in a direct path between the first node and the second node; sending one or more path packages from the first node to the second node via one or more relay nodes, each path package recording a reception time stamp and a sending time stamps at the relay nodes along associated relayed data path; automatically selecting one of the relayed data paths if a total OWL and an average jitter associated with the one of the relayed data paths satisfy predetermine criteria in comparison to the direct path; and sending data from the first node to the second node along the selected one of the relayed data paths. The method can further include cryptographically signing a path packet by a relay node in a relayed data path using a private key paired with a public key of the relay node. The method can further include cryptographically signing an updated version of a path packet by a relay node in a relayed data path, wherein the updated version of the path packet includes node IDs of a previous node and a next node along the relayed path and a measured OWL of a last routing segment along the relayed path. The node ID of the relay node is obtained from the public key of the relay node. The method can further include storing, at each of the updated nodes, a peer-node hash table that includes hash values of the node IDs of some of the updated nodes; and querying a node ID of the second node using peer-node hash tables stored at the first node and other updated nodes. The plurality of nodes in the peer-to-peer computer network can include one or more virtual nodes associated with a software defined network, wherein a relay node of the one of the relayed data paths can be a virtual node. One of the one or more relayed data paths can include two relay nodes that are the updated nodes in the peer-to-peer computer network, wherein data is sent from the first node to the second node via the two relay nodes. The total OWL associated with each of the one or more relayed data paths between the first node and the second node can be obtained by summing OWLs measured at all routing segments along the each of the one or more relayed data paths. The total OWL associated with a selected one of the relayed data paths can be smaller than the OWL measured in direct path from the first node to the second node. The average jitter associated with each of the one or more relayed data paths between the first node and the second node can be obtained by calculating a mean of jitters measured at all routing segments along the each of the one or more relayed data paths.

In another general aspect, the present invention relates to a non-transitory computer-readable medium storing a plurality of instructions which, when executed by one or more processors, cause the one or more processors to perform operations a computer network, the operations comprising: automatically updating a peer-to-peer computer network comprising a plurality of nodes each associated with a unique node ID, comprising: storing, at a first node, IDs of neighbor nodes that are connected to the first node in the peer-to-peer computer network; storing, at the first node, IDs of candidate nodes for connecting to the first node in the peer-to-peer computer network; automatically sending pulse messages from the first node to the neighbor nodes and the candidate nodes; in response to the pulse messages, receiving return pulses by the first node from at least some of the neighbor nodes and the candidate nodes; calculating round-trip times (RTTs) between the first node and the neighbor nodes or the candidate nodes based on the pulse messages and the return pulses; sorting the nodes in the neighbor nodes and the candidate nodes into a plurality of orbital bins each comprising nodes characterized by RTTs related to the first node within a specific interval; and automatically selecting and adding at least one node from one of the orbital bins based on the RTTs to updated neighbor nodes for the first node; and automatically routing data from the first node to a second node via a relay node that is one of updated nodes in the peer-to-peer computer network.

In another general aspect, the present invention relates to a computer system for autonomously routing data using in a peer-to-peer computer network, which includes: a communication module configured to send or receive data to and from nodes in a peer-to-peer computer network; and a computer memory storing the instructions that, when executed by the one or more processors at the plurality of nodes, cause the plurality of nodes to: automatically update a peer-to-peer computer network comprising a plurality of nodes each associated with a unique node ID, which stores, at a first node, IDs of neighbor nodes that are connected to the first node in the peer-to-peer computer network, stores, at the first node, IDs of candidate nodes for connecting to the first node in the peer-to-peer computer network, automatically sends pulse messages from the first node to the neighbor nodes and the candidate nodes, in response to the pulse messages, receives return pulses by the first node from at least some of the neighbor nodes and the candidate nodes, calculates round-trip times (RTTs) between the first node and the neighbor nodes or the candidate nodes based on the pulse messages and the return pulses, sorts the nodes in the neighbor nodes and the candidate nodes into a plurality of orbital bins each comprising nodes characterized by RTTs related to the first node within a specific interval, and automatically selects and adds at least one node from one of the orbital bins based on the RTTs to updated neighbor nodes for the first node, and automatically routes data from the first node to a second node via a relay node that is one of updated nodes in the peer-to-peer computer network.

One advantage of the disclosed systems, non-transitory computer-readable medium, and methods is that the disclosed peer-to-peer computer network can provide improved data transport without a single point of failure in the network. A simple directory service is provided to facilitate and validate secure end-to-end network connections in a global computer network.

Another advantage of the disclosed systems and methods is that the best data routing paths are calculated in a distributed fashion, which provides more robust and secure data transport. Decentralization of the protocol means that no single node should have authority on the selected/proposed best paths. The best path calculation is distributed, which makes it easier for other peers to verify the legitimacy of the path candidates.

Yet another advantage of the disclosed systems and methods is that the faster paths can be determined between Internet-connected computer devices without the requirement of clock synchronization between the computer devices.

Still another advantage of the disclosed systems and methods is in the scalability of the improved data routing through a decentralized network. The peer-to-peer network is open to all the nodes on the Internet, which include physical devices and virtual nodes. The data-routing protocols are designed in a trustless manner, which makes it highly unlikely for malicious nodes to affect the operations of the whole peer-to-peer network for a considerable amount of time and scale.

The disclosed decentralized network provides a buffer to the overall network load. Whenever or wherever a computer network is overburdened with traffic and experiences high latencies, the disclosed systems and methods can autonomously identify alternative routing paths and alleviate the traffic latency or congestion, which result in more consistent and reliable in the network's performance.

DETAILED DESCRIPTION OF THE INVENTION

To overcome the problems faced by the conventional network routing technologies, the present invention provides a decentralized system in which distributed nodes self-organize into a peer-to-peer computer network. Data transfer latencies and stabilities between nodes are continually measured and evaluated. When a data transport need arises between two nodes in the network, better performing paths between nodes are dynamically determined in the peer-to-peer computer network based on the up-to-date measured latencies and network stability.

Figure 1:
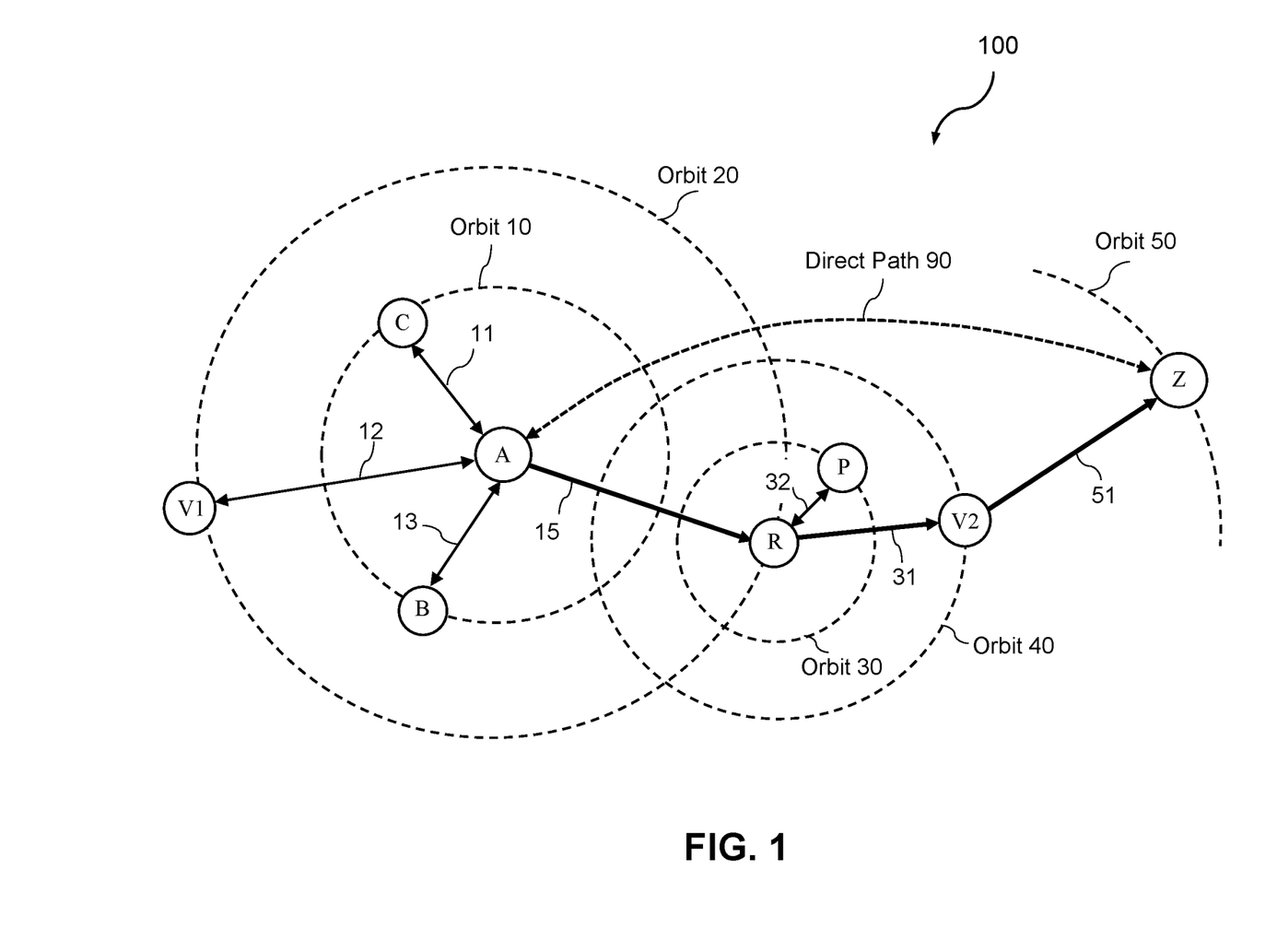
FIG. 1 shows a peer-to-peer computer network that is autonomously self-organized, updated, and discovering best data routing paths in accordance with some embodiments of the present invention.

In some embodiments, referring to FIG. 1, a peer-to-peer computer network 100 includes a plurality of nodes A, B, C, V1, R, P, V2, Z, etc. Some of the nodes (e.g., A, B, C, R, P, Z) can be physical computer devices or systems which are connected to the Internet. Some of the nodes (e.g., V1, V2 . . . ) can be virtual nodes that virtual machines or virtual agents defined in a software defined network. The peer nodes in the peer-to-peer computer network 100 can communicate with each other in encrypted messages using public/private key pairs. The public key of a node can be obtained from the node ID of the node, which is available to all peer nodes in the peer-to-peer computer network 100. All the nodes in peer-to-peer computer network 100 are pre-installed computer codes which contain protocols that govern the communications among the nodes, the set-up, maintenance, and governance within the peer-to-peer computer network 100, and measurements, data path selection, and data routing within the peer-to-peer computer network 100.

Figure 2:
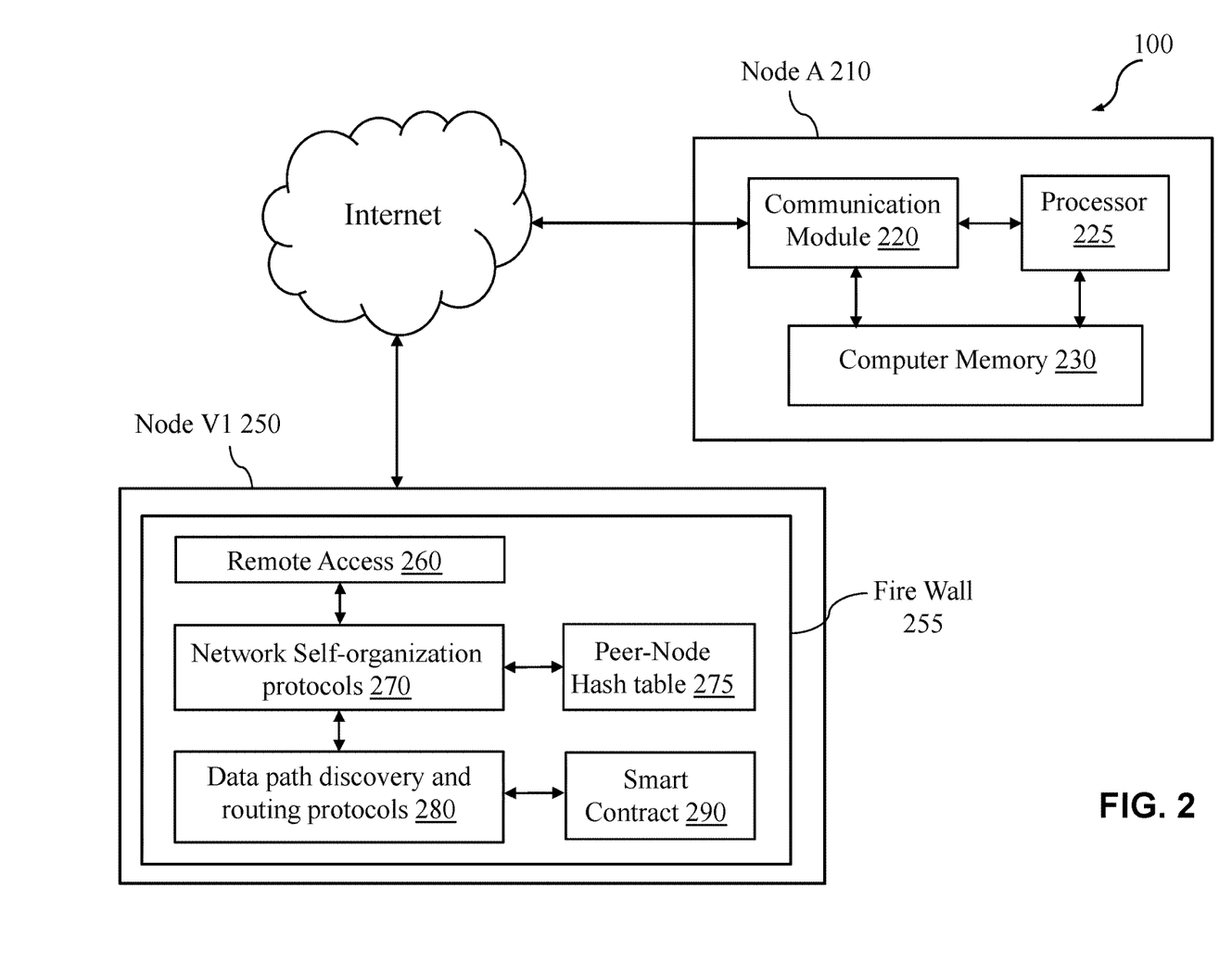
FIG. 2 shows details of exemplified nodes in a peer-to-peer computer network in accordance with some embodiments of the present invention.

FIG. 2 shows detailed components of two exemplified nodes node A 210 and node V1 250 in the peer-to-peer computer network 100. Node A 210 includes a communication module 220, a processor 225, and computer memory 230. The computer memory 230 stores computer codes that include instructions that define a distributed autonomous routing protocol (DARP), which can be executed by the processor 225 and the communication module 220. The components in the DARP are the same as those stored in a virtual node such as node V1 250, and their details are described below in conjunction with node V1 250.

The node V1 250 is a self-contained virtual system which resides in a host system or host device but isolated from the host by a firewall 255. A virtual node can run any executable or script that is supported by the operating system environment of the host system or host device. The node V1 250 includes a remote access module 260 that is configured to communicate with other nodes in the peer-to-peer computer network 100. The pre-installed DARP defines several applications or modules: network self-organization protocols 270, a peer-node hash table 275, data path discovery protocols 280, and smart contract 290. Analogously, these protocols and a peer-node hash table are stored in the computer memory 230 in the node A 210, which can be accessed and executed by the processor 225.

The peer-node hash table 275 can store IP addresses, port numbers, and protocols (such as TCP, UDP, DNS, etc.), which are information used to communicate with the nodes identified by the node IDs. The nodes may support multiple network protocols that can be used to exchange messages based on network parameters. Nodes can choose which protocol is best suited for a particular situation and switch when needed. Each node must have a Public/Private key pair in order to be able to join the network. A node ID is derived from the Public Key. The Public Key of node can also be obtained from Node ID, which allows other peer nodes to verify the authenticity of messages signed by this node. Thus, a node ID is not only an identifier for the node, but also the public key for decrypting messages sent by this node. Moreover, secure messages sent from other peer nodes to this node can be encrypted by the public key of this node, which can only be decrypted and read by the private key of this node.

The peer-node hash table 275 at each node contains a portion of the global node ID hash table for the whole peer-to-peer computer network. Importantly, other peer nodes can also query a peer-node even if its information is not stored in their own peer-node hash tables. Given each node is connected to the peer-to-peer computer network 100 and its node ID is stored in the peer-node hash tables at some peer nodes, any other node within the peer-to-peer computer network 100 may find it one way or another. Thus, with the sharing of information stored in peer-node hash tables, nodes in the peer-to-peer computer network 100 are not required to be directly connected for them to find each other. The node IDs and queries of the node IDs can be defined by Kademlia protocol.

The network self-organization protocols 270 stores instructions for tasks for autonomously setting up and maintaining the peer-to-peer computer network 100. Since there is no centralized command center, the peer-to-peer computer network 100 is formed and maintained solely by the distributed nodes, which makes the disclosed network more resilient against attacks and network failures. The disclosed peer-to-peer computer network 100 adopts a node-centric approach in organizing the relationship between a node and relationships to other nodes.

Referring to FIG. 1, node A is connected to node B, node C, node V1, and node R via connections 11, 12, 13, 15, respectively. These nodes that node A is connected to are stored as neighbor nodes at node A. Node A sends pulse messages to node B, node C, V1, R and some of the nodes reply and send return pulses back to node A. Using the time stamps of the pulse messages sent out and the reception time stamp of the return messages, node A can calculate round-trip times (RTTs) from the respective nodes. In some embodiments, the pulse messages can be based on User Datagram Protocol, TCP, or DNS protocols. Node A organizes its neighbor nodes according to the magnitudes of RTTs: for example, neighbor nodes having RTTs within [0, 10 ms] are placed in a first orbital bin; neighbor nodes having RTTs within [10 ms, 20 ms] are placed in a second orbital bin . . . . Graphically, the nodes can be visualized as located at different orbits around node A: node B and node C are on orbit 10 (~10 ms RTT) relative to node A, while node V1 and node R are located at an orbit 20 (~20 ms RTT) around node A, and so on.

In addition to data-transfer latencies, each node also measures jitters in its communication with other nodes. Details about latency measurements based on sending and reception time stamps and details about jitters in data transfer latencies between nodes are discussed in commonly assigned pending U.S. patent application Ser. No. 17/237,026, titled "Autonomously routing data using relay nodes pre-selected from a group of distributed computer nodes based on measured one-way latencies", filed Apr. 21, 2021, the content of which is incorporated herein by reference.

Since the peer-to-peer computer network 100 is a distributed system without a center, each of node B, node C, node V1, and node R measures RTTs from their respective neighbor nodes and organizes the respective neighbor nodes in a similar fashion as node A does, as described above. For example, node R is connected to neighbor node P with connection 32 and to neighbor node V2 via connection 31. Node P is located on an orbit 30 relative to node R and node V2 is located in an orbit 40 relative to node R. In a cascading fashion, all the updated nodes (current members) in the peer-to-peer computer network 100 are connected to each other: a first node is connected to its neighbors; each of the neighbors is connected to their respective neighbors.

Under the instructions of DARP, the RTTs between nodes are continually measured; the orbital bins around each node are regularly updated; nodes in the peer-to-peer computer network 100 are updated.

A distinct advantage of the presently disclosed system and method is that the latency measurements in the peer-to-peer computer network 100 does not require clock synchronization between peer nodes. Local clocks at different nodes can generally have skews or clock rate differences. The RTT measurements involve the subtraction of the reception time of a pulse message received by a neighbor node (or a candidate node) from the sending time of the return message back to the origination node. Thus, the offsets between clocks of a node and its neighbor nodes in the peer-to-peer computer network 100 can be canceled out. Details about independence of latency measurement against clock offset in a disclosed decentralized network are discussed in commonly assigned pending U.S. patent application Ser. No. 17/237,026, titled "Autonomously routing data using relay nodes pre-selected from a group of distributed computer nodes based on measured one-way latencies", filed Apr. 21, 2021, the content of which is incorporated herein by reference.

Each node (e.g., A, B, C, V1, R, P, V2, Z) in the peer-to-peer computer network 100 is represented by a unique node identification (ID). Each node (physical or virtual) in the peer-to-peer computer network 100 stores a hash table of hash values of the node IDs of some neighbor nodes (current members, or the updated nodes) in the peer-to-peer computer network 100 and the nodes' IP addresses, port numbers and protocols. The hash values in the peer-node hash table allow allows the node to quickly query some current members (mostly connected neighbor nodes, as well as candidate nodes that may be selected to be connected to the current node) of the peer-to-peer computer network 100. For example, node V1 250 can query some current members of the peer-to-peer computer network 100 using the hash values stored in the peer-node hash table 275 (FIG. 2). Moreover, node V1 can send requests to its neighbor nodes to query a node using peer-node hash tables at the neighbor nodes. Since the nodes in the peer-to-peer computer network 100 are interconnected in the above-described cascading fashion, node V1 250 can find any node in the peer-to-peer computer network and sends messages or data to another node within the peer-to-peer computer network 100 and manage the relationship with the other nodes in the peer-to-peer computer network 100.

Referring to FIGS. 1 and 2, the data path discovery protocols 280 guides the operation tasks for identifying, evaluating, and selecting data routing paths and sending data between a source node to a destination node along a selected relayed data path within the peer-to-peer computer network 100. For example, when a need arises for node A (source node) to send data to node Z (destination node) within the peer-to-peer computer network 100, DARP can discover multiple relayed data paths from node A to node Z by sending path packages, as described below in relation to FIG. 5, wherein each of the relayed data path includes at least one relay node that is a current member of the peer-to-peer computer network 100.

Under the guidance of DARP, a distributed node in the peer-to-peer computer network 100 can evaluate data-transmission latencies and jitters of the multiple candidate relayed data paths from node A to node Z. For example, a relayed data path from node A to node R to node V2 to node Z is identified and selected if the latencies and jitter meet preset criteria. This particular relayed data path includes two relay nodes (node R and V2 node) and three routing segments there in between: node A to node R; node R to node V2; and node V2 to node Z. The latencies of a relayed data path can be characterized by the total one-way latency (OWL), which is the sum of OWLs from all the routing segments of the relayed data path. The data jitter in the relayed data path can be represented by an average of data jitter in the routing segments that constitute the relayed data path. In parallel, node A sends pulse one or more path packages directly to node Z in a direct path as defined by conventional network routing protocols, which results in a measurement of the one-way latency for the direct path. If the total OWL in a relayed data path is shorter than the OWL of the direct path and the jitter in the relayed data path is below a threshold, that relayed data path can be selected to route data from node A to node Z, which gives better data-transport performance that the conventional method along the direct path.

Referring to FIG. 2, the smart contract 290 defines obligations and incentives for each node relative to the peer-to-peer computer network 100 and relative to each other. For example, after successful data transfer via a relayed data path, the relayed nodes can be paid by tokens typically by the source node that initiated the data transfer. The successful completion of data transfers and token transactions can be validated and recorded by peer nodes on a blockchain. In addition, those peer nodes that function as relay nodes can be validated and awarded by tokens for continuing to up and available to route data for its peers. These above and other conditions are defined in the smart contract, which are pre-agreed when nodes install DARP codes. Details about governance and utility of a decentralized data routing system including obligations and incentives of the peer nodes are disclosed in commonly assigned pending U.S. patent application Ser. No. 17/237,026, titled "Autonomously routing data using relay nodes pre-selected from a group of distributed computer nodes based on measured one-way latencies", filed Apr. 21, 2021 and commonly assigned pending U.S. patent application Ser. No. 17/463,883, titled "Utility and governance for secure, reliable, sustainable, and distributed data routing over the Internet", filed Sep. 1, 2021. The content of these patent applications is incorporated herein by reference.

Figure 3:
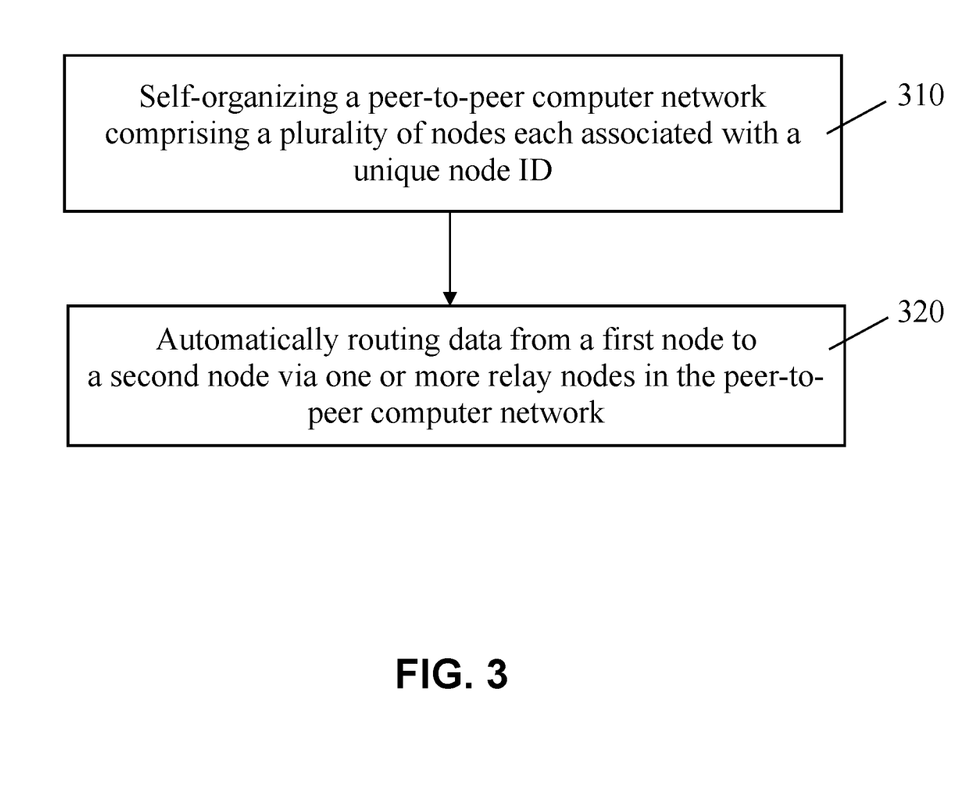
FIG. 3 is a flowchart for autonomously self-organizing a peer-to-peer computer network and routing data between nodes in the peer-to-peer computer network in accordance with some embodiments of the present invention.

Referring to FIG. 3, the method for autonomously routing data using in a peer-to-peer computer network (e.g., 100) can include two processes each comprising multiple steps: self-organizing a peer-to-peer computer network comprising a plurality of nodes each associated with a unique node ID (step 310) and automatically routing data from a first node to a second node via one or more relay nodes in the peer-to-peer computer network (step 320). Step 310 is related to setting up and maintaining a functional peer-to-peer computer network capable of routing data within the network. Each node in peer-to-peer computer network is represented by a unique ID. Hash values of these node IDs are stored in a peer-node hash table (e.g., 275 in FIG. 2). Step 320 involves the process of identifying, evaluating, and selecting relayed data paths for routing data between peer nodes in the peer-to-peer computer network. As described below in relation to FIGS. 4 and 5, the relay node is an updated node in the peer-to-peer computer network.

Figure 4:
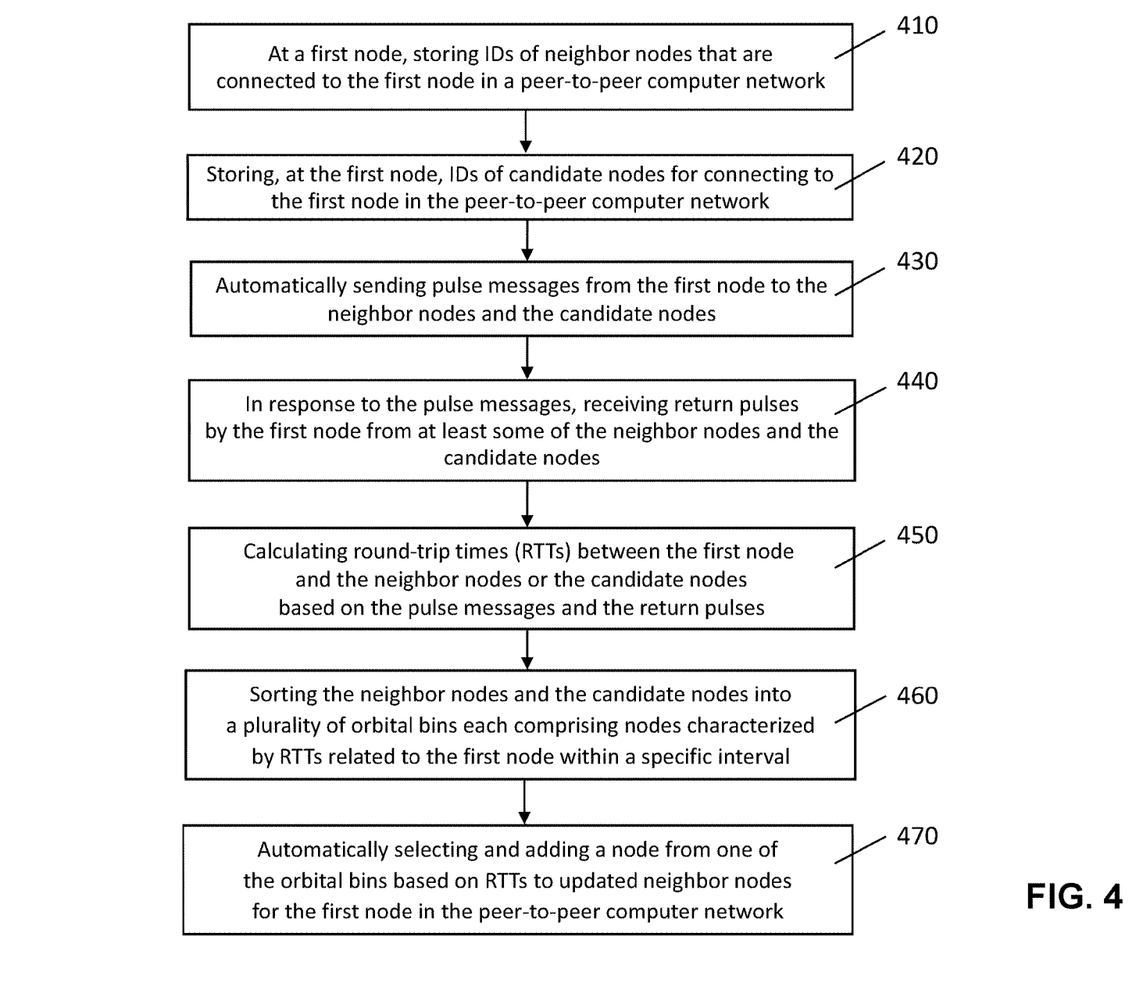
FIG. 4 is a detailed flowchart for self-organizing the peer-to-peer computer network in relation to FIG. 3.

The process of self-organizing a peer-to-peer computer network comprising a plurality of nodes each associated with a unique node ID (step 310) can include one or more of the following steps. Referring to FIG. 4, the first node in a peer-to-peer computer network stores information about of its neighbor nodes in the peer-to-peer computer network (step 410). In the example shown in FIG. 1, node A stores information of its neighbor nodes, such as node B, node C, node V1, and node R that node A is connected to in the peer-to-peer computer network. The information can include node IDs and other properties (such as IP addresses, port numbers, and protocols) of the neighbor nodes, which as described above can be stored in a peer-node hash table (e.g., 275 in FIG. 2).

Optionally, the first node can also store information about candidate nodes which are not currently connected to the first node in the peer-to-peer computer network but may be considered for connecting to the first node in the future (step 420). The candidate nodes are nodes that the first node is aware of and has incrementally stored previously. In some embodiments, the candidate nodes can be shared by the neighbor nodes of the first node. For example, in FIG. 1, Node A's neighbor nodes, i.e., node B, node C, node V1, and node R are in communication with node A. Under DARP protocols, these node A's neighbor nodes can share with node A about the nodes they are respectively connected to and are aware of. For instance, the candidate nodes stored at node A can include nodes that are connected to node B, node C, node V1, and node R, such as node P and node V2 that are connected to node R. The candidate nodes allow node A to explore a larger pool of nodes and to expand its network of neighbor nodes in each update. At the same time, some of the nodes that node A has been connected may become unstable or non-responsive or non-performing (e.g., increased data latencies or increased data jitter), these nodes may be dropped off from node A's connections (i.e., neighbor nodes, with more details described below). The balance of expansion and trimming of neighbor nodes (i.e., updated connection with the first node) assures a healthy operational peer-to-peer computer network.

In general, nodes are self-managed and self-organized in the peer-to-peer computer network based on the performance by the data connections between the nodes. Thus, the nodes in the peer-to-peer computer network are required by DARP protocols to continually measure performance characteristics (e.g., latency, jitter, etc.) of their connections. Based on the most updated performance measurements, the peer-to-peer computer network dynamically refreshes its members: some good performing nodes are added to neighbor nodes, and some non-response or bad performing nodes are removed from neighbor nodes. The updated neighbor nodes for all nodes in the peer-to-peer computer network form the updated nodes for the peer-to-peer computer network. To this end, pulse messages are regularly automatically sent from the first node to the neighbor nodes and the candidate nodes (step 430). Each of the pulse messages is characterized by a sending time stamp at the first node.

In response to the pulse messages, the first node receives return pulses from at least some of the nodes in the neighbor nodes and the candidate nodes (step 440). Each of the return pulses is characterized by a reception time stamp at the first node. Similarly, each of the pulse messages sent from the first node to one of the neighbor nodes or the candidate nodes is associated with a sending time stamp.

Next, round-trip times (RTTs) between the first node and neighbor nodes or the candidate nodes are calculated based on the pulse messages and the return pulses (step 450). Each of the return messages is characterized by a reception time stamp. Since both sending and reception times are measured at the first node, RTT calculations are independent of the clocks at the neighbor nodes and the candidate nodes. In other words, the RTTs are independent of the clock skews or rate discrepancies at the counterpart testing nodes. In the presently disclosed method, RTTs are used for monitoring connection performances between pairs of neighboring nodes in the peer-to-peer computer network.

The neighbor nodes and the candidate nodes are then sorted into a plurality of orbital bins each comprising nodes characterized by RTTs related to the first node within a specific interval (step 460). As noted above, each orbital bin is defined by a range of RTT such as [0 ms, 5 ms], [5 ms, 10 ms] . . . , etc. In one respect, nodes in different orbital bins can be considered to be at different distances from the first node in relation to data transport. The spread in "data transport distances" between the orbital bins assures an optimal reach of first node connections with its neighbor nodes. The nodes that have not successfully updated with RTTs are not sorted in the orbital bins.

From each of the orbital bins, at least one node is automatically selected based on RTTs associated with the node. The selected node is added to updated neighbor nodes for the first node (step 470). The sum of updated neighbor nodes of all the nodes in the peer-to-peer computer network form the updated nodes in the peer-to-peer computer network (step 470).

Within an orbital bin, a node having a shorter RTT can be selected, which gives a faster data transport within RTT range of that orbital bin. Moreover, the selection of the node within each orbital bin can also take into account jitters, bandwidths, clock rate differences, and other performance parameters measured by the pulse messages and the return pulses at the first node. A node will not be selected if measured jitters, bandwidths, clock rate differences, and other performance parameters exceed their respective thresholds. It should be noted that the neighbor nodes and the candidate nodes that are non-responsive to the pulse messages from the first node do not lead to updated RTT calculations and are not sorted into the orbital bins. These non-response nodes are thus discarded if some of them were on members of the peer-to-peer computer network. Furthermore, those nodes that have recently measured jitter exceeding a predetermined threshold can also be removed from the list of updated nodes in the peer-to-peer computer network if they have been.

In some embodiments, when two nodes in the same orbital bin have similar performances (in latencies and jitter), the node that has been an updated node in the peer-to-peer computer network for longer duration is selected. This criterion is based on the observation that nodes that have shown longer period of satisfactory performance are more likely to provide more reliable performance in the future.

Steps 410-470 are repeated for other nodes (e.g., B, C, V1, R, P, V2, Z, etc.) in the peer-to-peer computer network. In this way, node connections are regularly evaluated between pairs of neighboring nodes; the neighbor nodes are updated, which propagate through the whole peer-to-peer computer network.

Figure 5:
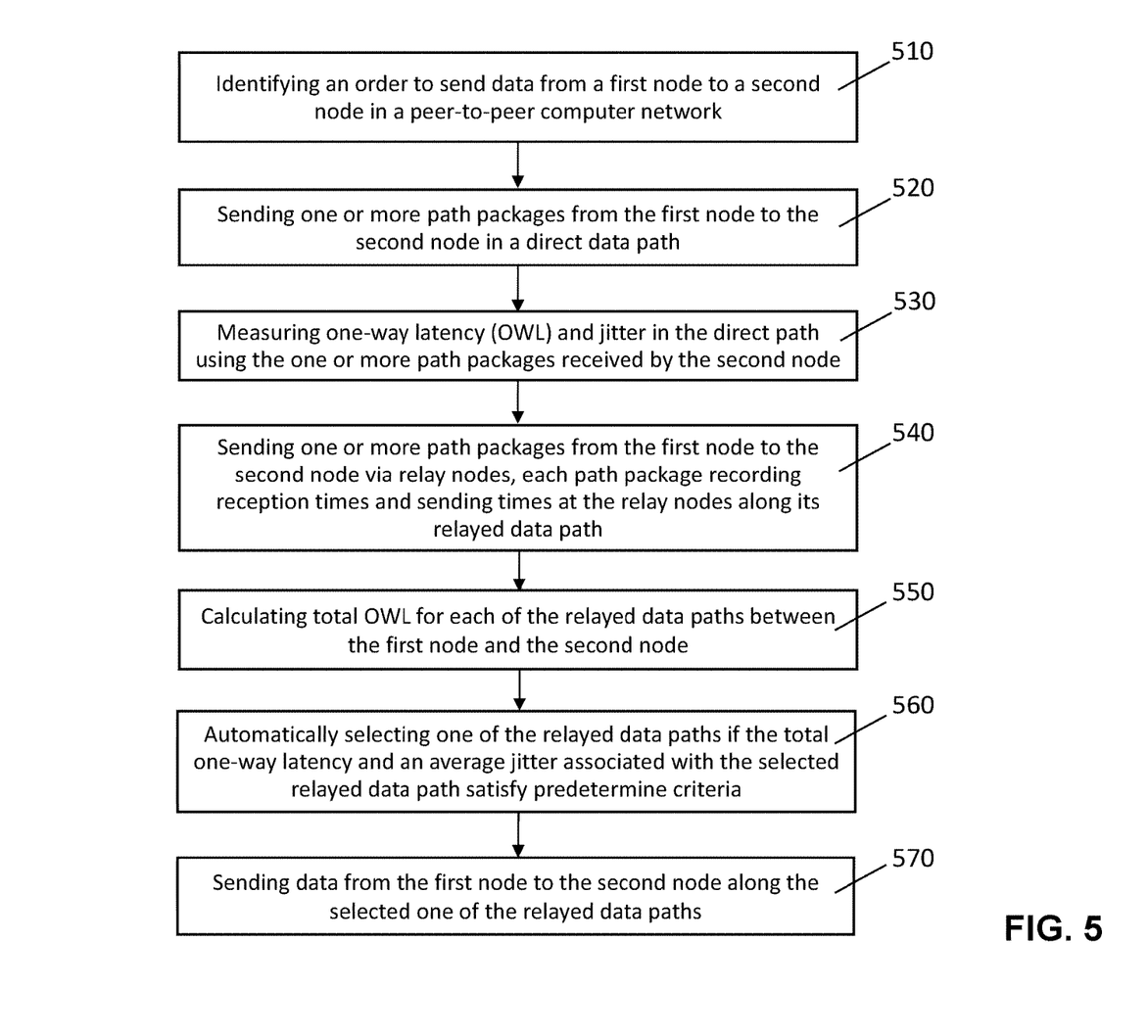
FIG. 5 is a detailed flowchart for autonomously routing data from a source node to a destination node in the peer-to-peer computer network in relation to FIG. 3.

The process of automatically routing data from a first node to a second node in the peer-to-peer computer network (step 320 in FIG. 3) can include one or more of the following steps. Referring to FIG. 5, an order or a need is first identified to send data from a first node to a second node in a peer-to-peer computer network (step 510). The IP address of the second node is looked up using the second node's ID on the peer-node hash table stored at the first node. One or more path packages are sent from the first node to the second node in a direct data path (step 520) as defined by conventional Internet routing. Each path package records all the timestamps from the first node, all the intermediate hops along the direct path, and the second node. One-way latency (OWL) and jitter are measured in the direct path between the first node and the second node using the one or more path packages received at the second node (step 530). The OWL of the direct path is the reception time at the second node subtracted by the sending time recorded at the first node. The conventional direct data path is used as a benchmark for the improved performance of the relayed data paths.

Next, relayed paths between the first node and the second node are searched for and selected. One or more path packages are sent from the first node to the second node via relay nodes (step 540). Each path package records the reception time and the sending time at each relay node along its path as well as the sending time at the first node. Each of the relayed data paths includes one or multiple relay nodes that are from the updated nodes in the peer-to-peer computer network (step 540). Using FIG. 1 as an example, when node A wants to find relayed paths to node Z, node A sends path packets to its neighbor nodes in the orbital bins (e.g., node B, C, R, V1, etc.). Thus, the updated neighbor nodes have been recently updated using pulse messages and RTT and jitter measurements as described above. Each of the neighbor nodes receiving a path packet records a reception timestamp and a seconding timestamp to the path package. Then, the node A's neighbor node transmits this updated path packet forward to its neighbor node (e.g., from node R to node P and node V2). The relaying operation is repeated until the destination node is reached, or certain constraints are not met anymore (e.g., the number of hops has exceeded the maximum number of hops along each relayed path). Thus, a path packet that successfully arrives at the destination node Z includes the timestamps of all the intermediate hops for the specific relayed path.

An important aspect for the presently disclosed cascaded path packages is in its network security. At each hop, a relay node cryptographically signs the path packet with its private key paired with a public key of the relay node. Thus, the destination node (or the second node) can cryptographically verify the integrity and authenticity of all the hops (or routing segments) along the relayed path. Thus, no intermediate node can alter hop timestamps or the list of hops. In some embodiments, the construction of a path packet along the data path (a potential data relay path) can include the following steps: the source node builds a path packet describing constraints (e.g., the maximum number of hops allowed along the relayed path) and the destination node; the source node cryptographically signs the path packet using the node ID of the source node, the node ID of the destination, the node ID of the first hop node (i.e. the first hop), and sends this path packet to the first relay node along with the signature; the first hop node records OWL, jitter, etc. of this hop; the first hop node cryptographically signs the path packet using the source node signature, recorded OWL, jitter, etc. and the node ID of the second hop node, and sends the updated path package to the second hop node; the second hop node repeats the steps of the first hop node; and these steps are repeated till the path package is received by the destination node. The destination node receives a chain of signatures that each depends on the previous signatures as well as recorded measurements along each routing segment, which prevents the content of the path packet from being altered by the intermediate malicious nodes. (When a data path is indeed selected for data routing, its hop nodes will function as relay nodes for data routing.)

In the above described method, the first node (the source node) can find the second node (the destination node) even if they are not directly connected or the second node is not listed in the peer-node hash table of the first node. Moreover, the relay nodes may or may not be directly connected to the first node (the source node) or the to the second node (destination node). Additionally, these relay nodes have been recently or currently updated by their respective neighbor nodes, which means that they provide good data transfer performance via their connections. In some embodiments, the search for the destination node is enabled by Kademlia protocol, which allow a node to find information (node ID etc.) about a previously unseen node that is connected to the whole peer-to-peer computer network, and to send path packets to that node.

For each path package that originates from the first node and received by the second node, the total OWL for each of the relayed data paths between the first node and the second node is calculated (step 550). Since the sending time and reception time are recorded by the path package for each routing segment, the OWL for each routing segment is simply the difference between the reception time of the receiving node subtracted by the sending time of the sending node for that routing segment. The total OWL for the relayed path from the first node to the second node is the sum of all the OWLs of the routing segments along the relayed path. Since each relay node resends the next path package right after it receives one, the clock skew or clock discrepancy is cancelled out between the reception time and sending time at the relay node. In other words, the total OWL is independent from the clock discrepancies at the relay nodes along the relayed path. Details about one-way latencies along a relayed path and its independence of the clocks of the relayed nodes are discussed in commonly assigned pending U.S. patent application Ser. No. 17/237,026, titled "Autonomously routing data using relay nodes pre-selected from a group of distributed computer nodes based on measured one-way latencies", filed Apr. 21, 2021, the content of which is incorporated herein by reference.

One of the relayed data paths is automatically selected if a total OWL and an average jitter associated with the relayed data path satisfy predetermine criteria in comparison to the direct path (step 560). The selected relayed data path is the best performing among all the relayed path with lowest total OWL and data transfer jitters below a threshold. The selected relayed data path also has a total OWL shorter than the OWLs of other identified relayed data paths and the direct data path. The average jitter associated with a relayed data paths from the first node to the second node is calculated by a mean of jitters measured at all routing segments along the relayed data path. Details about jitters in data transfer latencies between nodes are disclosed in commonly assigned pending U.S. patent application Ser. No. 17/237,026, titled "Autonomously routing data using relay nodes pre-selected from a group of distributed computer nodes based on measured one-way latencies", filed Apr. 21, 2021, the content of which is incorporated herein by reference. The selection of one of the relayed data paths can also be based on bandwidths of each of the associated routing segments, and clock rate differences between the relay node and the sending node or the receiving node, etc. A node is not selected to be a relay node if the measured bandwidths of the associated routing segments are below a threshold, or the clock rates between the potential relay node and the sending node or the receiving node are too large.

Once a relayed data path is selected within the peer-to-peer computer network, the first node can send data to the second node along the selected one of the relayed data paths (step 570). It should be noted that the relay nodes can be physical nodes or SDN-defined virtual nodes in the peer-to-peer computer network. After a successful relayed data routing, the relay nodes can be subsequently rewarded by the party (typically the first node or the source node) that has requested the data transport. The award can be in the form of a transfer of tokens. The transactions can be recorded on a blockchain. Details about the awards, validation of transactions, and related tokenomics are disclosed in commonly assigned pending U.S. patent application Ser. No. 17/237,026, titled "Autonomously routing data using relay nodes pre-selected from a group of distributed computer nodes based on measured one-way latencies", filed Apr. 21, 2021 and commonly assigned pending U.S. patent application Ser. No. 17/463,883, titled "Utility and governance for secure, reliable, sustainable, and distributed data routing over the Internet", filed Sep. 1, 2021. The content of these patent applications is incorporated herein by reference.

The above embodiments are only used to illustrate the technical solution of the present invention but not to limit it. Those skilled in the art can modify or equivalently replace the technical solution of the present invention without departing from the spirit and scope of the present invention. The scope of protection shall be subject to the claims.

The invention claimed is:

1. A method for autonomously routing data in a peer-to-peer computer network, comprising:
   automatically updating the peer-to-peer computer network comprising a plurality of nodes each associated with a unique node ID, wherein the peer-to-peer computer network includes a first node and neighbor nodes connected to the first node, comprising:
   automatically sending pulse messages from the first node to the neighbor nodes and candidate nodes associated with the first node, wherein the candidate nodes are candidates for the neighbor nodes of the first node;
   in response to the pulse messages, receiving return pulses by the first node from at least some of the neighbor nodes and the candidate nodes;
   calculating round-trip times (RTTs) between the first node and the neighbor nodes or the candidate nodes based on the pulse messages and the return pulses; and
   automatically selecting and adding at least one of the neighbor nodes or the candidate nodes based on the RTTs to updated neighbor nodes for the first node; and
   automatically routing the data from the first node to a second node via a relay node that is one of the updated neighbor nodes in the peer-to-peer computer network, wherein the relay node is selected based on at least one of one-way latencies (OWL), jitters, or bandwidths from the first node to the relay node, from the relay node to the second node, and from the first node to the second node.

2. The method of claim 1, wherein the step of automatically updating the peer-to-peer computer network further comprises:
   sorting the neighbor nodes and the candidate nodes into a plurality of orbital bins each comprising nodes characterized by RTTs related to the first node within a specific interval; and
   automatically selecting and adding at least one node from one of the orbital bins based on the RTTs to the updated neighbor nodes for the first node.

3. The method of claim 2, wherein the at least one node is selected from each of the orbital bins further based on durations of the at least one node that has been an updated neighbor node in the peer-to-peer computer network.

4. The method of claim 2, wherein the at least one node is selected from one of the orbital bins further based on jitters, bandwidths, and clock rate differences associated with the nodes in the one of orbital bins.

5. The method of claim 1, wherein an RTT between the first node and a node in the neighbor nodes or the candidate nodes is calculated by a sending time stamp of a pulse message sent from the first node and a reception time stamp of a return pulse received by the first node in response to the pulse message, the sending time stamp and the reception time stamp being both recorded at the first node.

6. The method of claim 1, wherein updating the peer-to-peer computer network comprising the plurality of nodes further comprises:
   discarding a node from the updated neighbor nodes for the first node if no return pulse is received from the node by the first node after a pulse message is sent from the first node to the node.

7. The method of claim 1, wherein updating the peer-to-peer computer network comprising the plurality of nodes each associated with the unique node ID further comprises:
   discarding a node from the updated neighbor nodes for the first node if return pulses from the node have jitter exceeding a predetermined threshold.

8. The method of claim 1, wherein the updated nodes in the peer-to-peer computer network are formed by updated neighbor nodes associated with individual nodes in the plurality of nodes in the peer-to-peer computer network.

9. The method of claim 1, wherein step of automatically routing the data from the first node to the second node via the relay node that is the one of updated nodes in the peer-to-peer computer network further comprises:
- sending one or more path packets from the first node directly to the second node to measure a one-way latency (OWL), jitter, and bandwidths in a direct path between the first node and the second node;
- sending one or more path packets from the first node to the second node via one or more relay nodes, each path packet recording a reception time stamp and a sending time stamps at the relay nodes along associated relayed data path;
- automatically selecting one of the relayed data paths if a total OWL, an average jitter, and bandwidths associated with the one of the relayed data paths satisfy predetermine criteria in comparison to the direct path; and
- sending the data from the first node to the second node along the selected one of the relayed data paths.

10. The method of claim 9, further comprising:
- cryptographically signing a path packet by a relay node in a relayed data path using a private key paired with a public key of the relay node.

11. The method of claim 9, further comprising:
- cryptographically signing an updated version of a path packet by a relay node in a relayed data path, wherein the updated version of the path packet includes node IDs of a previous node and a next node along the relayed path and a measured OWL of a last routing segment along the relayed path.

12. The method of claim 9, wherein a node ID of the relay node is obtained from the public key of the relay node.

13. The method of claim 9, further comprising:
- storing, at each of the updated nodes, a peer-node hash table that includes hash values of the node IDs of some of the updated nodes; and
- querying a node ID of the second node using peer-node hash tables stored at the first node and other updated nodes.

14. The method of claim 9, wherein the plurality of nodes in the peer-to-peer computer network includes one or more virtual nodes associated with a software defined network, wherein a relay node of the one of the relayed data paths is a virtual node.

15. The method of claim 9, wherein the total OWL associated with each of the one or more relayed data paths between the first node and the second node is obtained by summing OWLs measured at all routing segments along the each of the one or more relayed data paths.

16. The method of claim 9, wherein the total OWL associated with a selected one of the relayed data paths is smaller than the OWL measured in direct path from the first node to the second node.

17. The method of claim 9, wherein the average jitter associated with each of the one or more relayed data paths between the first node and the second node is obtained by calculating a mean of jitters measured at all routing segments along the each of the one or more relayed data paths.

18. A non-transitory computer-readable medium storing a plurality of instructions which, when executed by one or more processors, cause the one or more processors to perform operations in a peer-to-peer computer network, the operations comprising:
- automatically updating the peer-to-peer computer network comprising a plurality of nodes each associated with a unique node ID, wherein the peer-to-peer computer network includes a first node and neighbor nodes connected to the first node, comprising:
  - automatically sending pulse messages from the first node to the neighbor nodes and candidate nodes associated with the first node, wherein the candidate nodes are candidates for the neighbor nodes of the first node;
  - in response to the pulse messages, receiving return pulses by the first node from at least some of the neighbor nodes and the candidate nodes;
  - calculating round-trip times (RTTs) between the first node and the neighbor nodes or the candidate nodes based on the pulse messages and the return pulses; and
  - automatically selecting and adding at least one of the neighbor nodes or the candidate nodes based on the RTTs to updated neighbor nodes for the first node; and
- automatically routing data from the first node to a second node via a relay node that is one of the updated neighbor nodes in the peer-to-peer computer network, wherein the relay node is selected based on at least one of one-way latencies (OWL), jitters, or bandwidths from the first node to the relay node, from the relay node to the second node, and from the first node to the second node.

19. The non-transitory computer-readable medium of claim 18, wherein step of automatically routing the data from the first node to the second node via the relay node that is the one of updated nodes in the peer-to-peer computer network further comprises:
- sending one or more path packets from the first node directly to the second node to measure a one-way latency (OWL) and jitter in a direct path between the first node and the second node;
- sending one or more path packets from the first node to the second node via one or more relay nodes, each path packet recording a reception time stamp and a sending time stamps at the relay nodes along associated relayed data path;
- automatically selecting one of the relayed data paths if a total OWL and an average jitter associated with the one of the relayed data paths satisfy predetermine criteria in comparison to the direct path; and
- sending the data from the first node to the second node along the selected one of the relayed data paths.

20. A computer system for autonomously routing data in a peer-to-peer computer network, comprising:
- a communication module configured to send or receive the data to and from a plurality of nodes in the peer-to-peer computer network; and
- a computer memory storing instructions that, when executed by one or more processors at the plurality of nodes, cause the plurality of nodes to:
  - automatically update the peer-to-peer computer network comprising the plurality of nodes each associated with a unique node ID, wherein the peer-to-peer computer network includes a first node and neighbor nodes connected to the first node, comprising steps of:
    - automatically sending pulse messages from the first node to the neighbor nodes and candidate nodes associated with the first node, wherein the candidate nodes are candidates for the neighbor nodes of the first node;
    - in response to the pulse messages, receiving return pulses by the first node from at least some of the neighbor nodes and the candidate nodes;

calculating round-trip times (RTTs) between the first node and the neighbor nodes or the candidate nodes based on the pulse messages and the return pulses; and automatically selecting and adding at least one of the neighbor nodes or the candidate nodes based on the RTTs to updated neighbor nodes for the first node; and automatically route the data from the first node to a second node via a relay node that is one of the updated neighbor nodes in the peer-to-peer computer network, wherein the relay node is selected based on at least one of one-way latencies (OWL), jitters, or bandwidths from the first node to the relay node, from the relay node to the second node, and from the first node to the second node.

21. The computer system of claim 20, wherein the instructions that, when executed by the one or more processors at the plurality of nodes, further cause the plurality of nodes to send one or more path packets from the first node directly to the second node to measure a one-way latency (OWL) and jitter in a direct path between the first node and the second node;

send one or more path packets from the first node to the second node via one or more relay nodes, each path packet recording a reception time stamp and a sending time stamps at the relay nodes along associated relayed data path;

automatically select one of the relayed data paths if a total OWL and an average jitter associated with the one of the relayed data paths satisfy predetermine criteria in comparison to the direct path; and send the data from the first node to the second node along the selected one of the relayed data paths.

* * * * *